United States Patent [19]

Corkhill

[11] 4,173,749
[45] Nov. 6, 1979

[54] DIGITAL DRIVE AND PHASE-LOCK FOR SEISMIC VIBRATORS

[75] Inventor: David P. Corkhill, Aberdeen, Scotland

[73] Assignee: Standard Oil Company (Indiana), Chicago, Ill.

[21] Appl. No.: 776,145

[22] Filed: Mar. 10, 1977

[51] Int. Cl.$^2$ ............................................. G01V 1/14
[52] U.S. Cl. .................................. 367/190; 323/101; 367/41
[58] Field of Search ..... 340/17 R, 15.5 TA, 15.5 TC; 323/101, 106

[56] References Cited

U.S. PATENT DOCUMENTS

| | | | |
|---|---|---|---|
| 3,761,874 | 9/1973 | Landrum, Jr. | 340/17 R |
| 3,863,202 | 1/1975 | Landrum, Jr. | 340/17 R |
| 3,881,167 | 4/1975 | Pelton et al. | 340/15.5 TA |
| 3,895,343 | 7/1975 | Farr | 340/17 R |
| 3,979,715 | 9/1976 | Hufstedler et al. | 340/15.5 TA |

Primary Examiner—Howard A. Birmiel
Attorney, Agent, or Firm—Arthur McIlroy

[57] ABSTRACT

This invention concerns a synchronizing control for an electro-hydraulic seismic vibrator, which control utilizes a magnetic tape cassette reader that puts out a train of pulses of changing time spacing of a preselected pattern. This operates a counter which controls the address of a read-only memory which has a selected number of memory locations, each one holding a corresponding one of a sequence of digitized values forming a single cycle of a sine wave. By continuing to operate the counter, each of the values stored in the memory is sequentially placed in an output circuit to provide a digitized sinusoidal reference sweep signal. The cassette reader signal also drives a second counter through a frequency ratio control of the pulses provided by the cassette. By this means, the second counter can be varied to count at a different rate from the first counter. The second counter also addresses the read-only memory, and the outputted digital signals are converted to an analog signal which is used as the drive sweep for the vibrator. The motion of the vibrator baseplate is detected by an accelerometer, the signal of which is doubly integrated and converted to digital form. One of two identical digital filters filters the reference sweep signal and the other the accelerometer signal. The filter outputs then go to a phase comparison network which controls the frequency ratio control of the second counter. When the reference sweep leads or lags the output signal from the accelerometer, the frequency ratio control advances the second counter at a higher or a lower rate, as necessary, to convert the second digital output of the memory to a correspondingly different phase, in order to correct the phase relation of the vibrator output and the reference sweep.

11 Claims, 4 Drawing Figures 4,173,749

DIGITAL DRIVE AND PHASE-LOCK FOR SEISMIC VIBRATORS

BACKGROUND OF THE INVENTION

1. Field of the Invention

This invention lies in the field of control of electrohydraulic devices and similar apparatus. More particularly, it lies in the field of the electrohydraulic vibrators which are used to generate seismic signals in the earth. Still more particularly, it concerns a digital apparatus to generate both a reference and a drive sweep signal for the vibrator, and includes means to change the relative phase of these two sinusoidal signals.

2. Description of the Prior Art

In the prior art, there have been a number of designs of phaselock systems by means of which a seismic vibrator can be phaselocked or synchronized with a reference sweep signal. These have generally been analog devices, which are slow in response and in correcting the phase of the drive. Furthermore, they are prone to overdrive or overcorrect, which results in hunting of the driven apparatus. Such analog systems further provide very poor phaselock at low frequencies, and poor recovery of control on the occurrence of transient interruptions or variations in the output of the device.

SUMMARY OF THE INVENTION

It is the primary object of this invention to provide an apparatus for generating a digital sinusoidal reference sweep signal, and a digital sinusoidal drive sweep signal for controlling a vibrator, and to provide a digital phase comparison system for controlling the generation of the drive sweep signal so as to maintain a selected phase relation between the output of the vibrator and the reference sweep signal.

It is a further object of this invention to provide a magnetic recording cassette on which is prerecorded a train of pulses of selected changing time spacing, which is the primary control of the system.

These and other objects are realized and the limitations of the prior art are overcome in this invention by using a read-only memory of a selected number of address locations containing a series of digital numbers corresponding to a sequence of digitized values that correspond to a single cycle of a sine wave. The memory locations are addressed in sequence by a counter which is driven by a series of pulses of varying time spacing. As the memory addresses are sequentially selected, the memory outputs a series of digital numbers which, when converted to analog form, comprise a sinusoidal variable frequency sweep signal.

A second counter is also used to address the memory locations independently of the first counter, whereby the memory outputs two series of digital words. The first counter is controlled directly from the series of pulses, producing a reference sweep. The second counter, which is controlled by the sequence of pulses through a frequency ratio control, provides a second sinusoidal sweep signal, the phase of which can be varied with respect to the reference sweep signal, by changing the count of the second counter with respect to the first counter. The second counter produces a sinusoidal sweep signal which is called the drive signal, and which nominally leads the reference sweep signal, to compensate for the normal delay or lag in operation of the baseplate of the vibrator in response to the sweep signal.

As is conventionally done, the motion of the baseplate is detected by a sensor such as an accelerometer, the signal of which is doubly integrated and digitized. The reference sweep signal and the digitized sensor signal are then phase-compared to determine how the phase of the drive sweep signal should be varied on order to bring the sensor signal into phase with the reference signal.

To provide a proper comparison, both digital signals are filtered through identical digital filters and compared in a phase comparator, which controls the frequency ratio of the pulses which control the second counter. When the reference sweep leads the sensor or baseplate signal so that the drive sweep needs to be advanced, the phase comparator outputs a signal to increase the frequency ratio of the pulses reaching the second counter, until it advances to the point where the phase of the baseplate signal is the same as that of the reference sweep signal, and so on.

Additional means are provided for tapering the starting and the stopping ends of the drive sweep. This is done by an up-down counter and a digital multiplier. The up-down counter puts out a series of fractional numbers from 0 to 1, and when these are multiplied by each of the digital numbers which go to the drive sweep, the amplitude of the analog output of the drive sweep will be varied in accordance with the magnitude of the fraction which is outputted by the counter at any given time. A control in the cassette provides the pulses to drive the counter up at the start of the sweep, and, at the end of the sweep, to drive the counter down, to provide the terminating taper.

Alternate means are shown for electronically generating the taper number, which goes to the previously mentioned multiplier. Also an alternate electronic network is described for generating the series of pulses, which in the first embodiment were provided by the recorded magnetic tape of the cassette.

BRIEF DESCRIPTION OF THE DRAWINGS

These and other objects and advantages of this invention, and a better understanding of the principles and details of the invention, will be evident from the following description taken in conjunction with the appended drawings in which.

DESCRIPTION OF THE PREFERRED EMBODIMENT

Figures 1, 2:
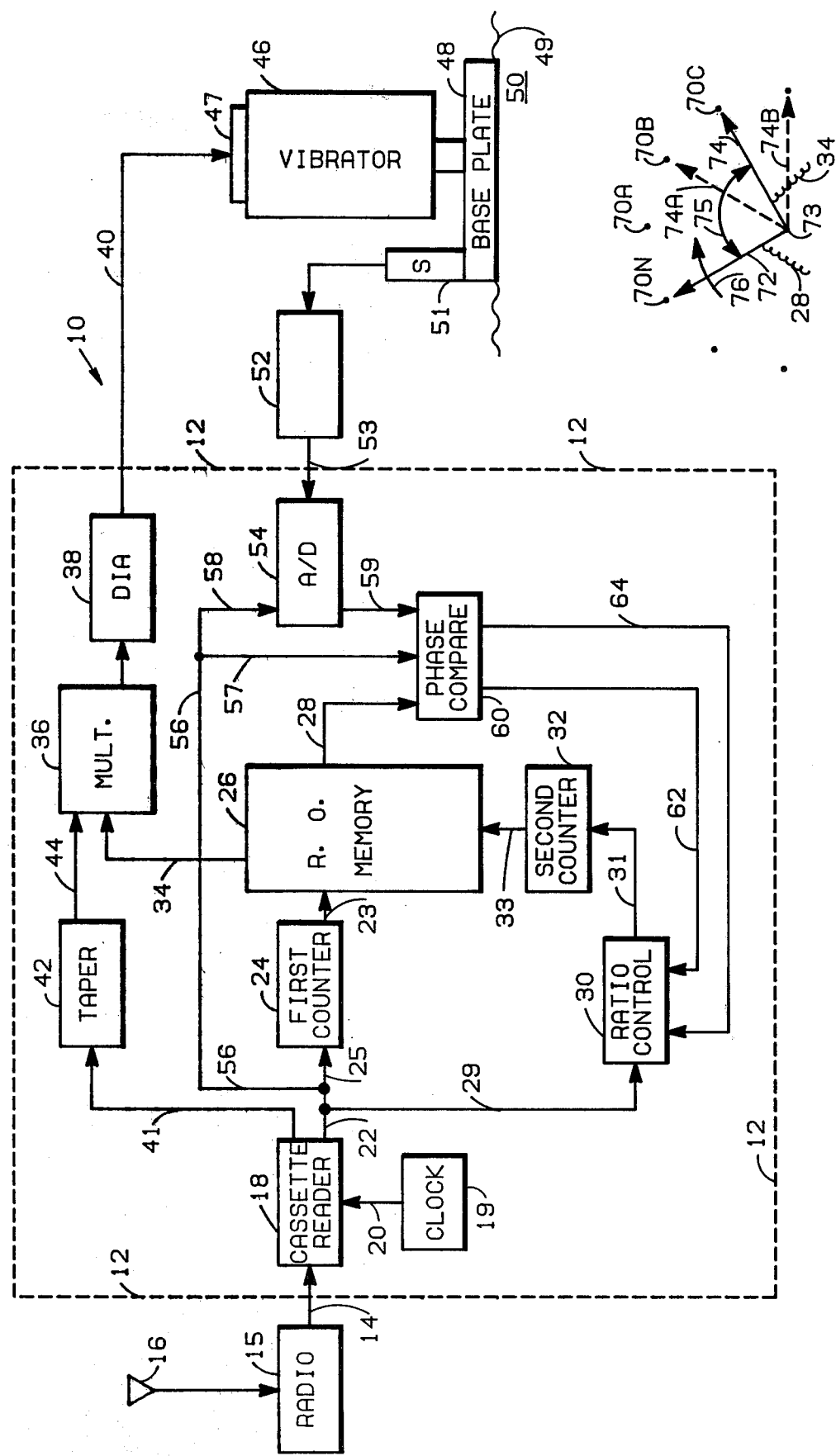
FIG. 1 illustrates in schematic fashion one embodiment of this invention.
FIG. 2 illustrates a detail of FIG. 1.

Referring now to the drawings and in particular to FIG. 1, there is shown in schematic form one embodiment of this invention, indicated generally by the numeral 10. Enclosed in the dashed outline 12 is a digital apparatus for generating a sinusoidal drive sweep signal which is outputted on line 40, to drive an electrohydraulic vibrator 46 which is resting with its baseplate 48 on the surface 49 of the earth 50. On the baseplate is a sensor 51, which is nominally an accelerometer, the output of which is doubly integrated in an integrator 52 which provides the integrated sensor signal on a lead 53 to the control apparatus.

The heart of the system is a read-only memory 26 which comprises a number of memory locations, such as for example 128, in each of which is stored a number which represents one of 128 digital amplitude values that in sequence correspond to a single cycle of a sine wave. In other words, as each one of the address locations is read out, the sequence of numbers will be a digital sine wave.

A time-varying series of pulses is provided on a magnetic tape in a cassette reader 18. The cassette is driven at constant speed by means of a clock 19 through lead 20, so that the output pulses on lead 22 will be precisely timed in accordance with the master program, from which the cassette tape was copied. The pulses on line 22 go to a first digital counter 24, the count of which at any instant on leads 23 goes to the read-only memory 26 and, depending on the count, contacts a specific memory location. The digital values stored therein are then outputted on line 28, and this is the reference sweep signal. The sinusoidal components are provided by the memory, and the varying repetition rate of the sine wave is derived from the varying time-spaced pulses which are pre-recorded on the magnetic tape of the cassette.

A second counter 32 is driven by the pulse output of the cassette through lead 29 which feeds a frequency ratio control 30 which will be described in detail in connection with FIG. 3 and which sets the rate of the output pulse train on lead 31. The second counter 32 is connected to the memory 26 by leads 33, and for each count of the counter 32, a digital word is outputted over lead 34 to a digital multiplier 36 and to a digital-to-analog converter 38, the output of which is the drive sweep signal on lead 40.

If the frequency ratio control 30 is set at unity, then both counters 24 and 32 will read the same number, and the same addresses will be contacted, and the drive sweep and the reference sweep signals will be in synchronism. However, it is well known that the drive sweep must be set at an advance phase ahead of the reference sweep so that, with the normal phase delay in the electrohydraulic vibrator 46, the baseplate 48 will then be in phase with the reference sweep signal.

Since the frequency ratio control is therefore the means of shifting the phase of the digital drive sweep signal on 34, with respect to the digital reference sweep signal on 28, it is controlled by the phase comparator 60 through leads 62 and 64.

The drive sweep signal on lead 40 goes to the electronic control 47 of the seismic vibrator 46 positioned with its baseplate 48 on the surface 49 of earth 50. In operation this produces a pulsating sinusoidal pressure on the surface of the earth which generates seismic waves that propagate through the earth as is required in seismic operations.

The output of an accelerometer sensor 51 fastened to the baseplate 48 so as to be responsive to the output of the vibrator is doubly integrated in 52, so that the output analog signal on line 53 is substantially a measure of the alternating displacement of the baseplate, except that it may have harmonics due to the operation of the vibrator. The signal on lead 53 goes to analog-to-digital converter 54 which outputs to comparator 60 a digital signal 59, representing the baseplate displacement amplitude.

The reference sweep signal on 28 also goes to phase comparator 60, where the phase of the two signals is compared, and appropriate signals are sent to the frequency ratio control 30 and then to the second counter 32, to alter the phase of the drive sweep signal whenever the baseplate signal and the reference sweep signal are not in phase.

In lead 34, which carries the digital drive sweep signal, there is a digital multiplier 36. As is well known, in seismic vibrator systems the drive sweep, which is a sinusoidal varying-frequency, long-duration signal, is normally tapered at its beginning and ending portions. This taper involves gradually increasing the amplitude at the start of the sweep from zero to a maximum constant value, and during a corresponding period at the end of the sweep, similarly reducing the amplitude from its constant value down to zero. These tapers can be set for varying rates of increase and decrease.

In this embodiment, on a second track of the magnetic tape in the cassette reader 18 there is a control signal sent by line 41 to a counter in a taper control box 42. Pulses of the cassette properly timed with the pulses going out on line 22, control the counter in box 42 to provide an output digital number on line 44 which increases with time in the selected manner from 0 to 1. As this digital number on line 44 is a second input to the multiplier 36, it acts to control the amplitude of the sine wave outputting on line 40 in accordance with the selected taper, at the beginning and the end of the sweep.

This is a complete description of the system in FIG. 1 except for the control of the cassette reader 18 by a radio-transmitted signal which is received by antenna 16 to the radio receiver 15. This provides a start signal on line 14 to the cassette reader to start reading-out the prerecorded values.

Referring now to FIG. 2, there is shown in a simple schematic manner the operation of the read-only memory 26. Consider a type of electromechanical contactor in which a movable contact 72 is rotated about axis 73, and is sequentially stepped from one to another of the terminals numbered 70A, 70B, 70C, 70D, . . . 70N. There is also a second rotating contact 74 which may be contacting the same contacts (or may be in a separate apparatus synchronized or driven by the same signals as the contact 72). Associated with each of the contacts 70 is a digital number which, when the rotating contact 72 contacts that terminal, the number than appears on the lead 28 or 34, as appropriate. Consequently, as the counters 24 or 32 continually increment, they step the contacts 72 and 74 from one terminal to the other in accordance with arrow 76.

One of these contacts 72 runs at the speed of the pulses on the line 22 from the cassette reader. The other, contactor 74 while it nominally operates in synchronism with the first contact 72, has a further frequency ratio control means 30, which causes it to step faster or slower as required in order to maintain a selected angle 75 in advance of 72. This advance is an amount of phase lead, which equals the phase lag normal to the vibrator at each value of frequency.

Figure 3:
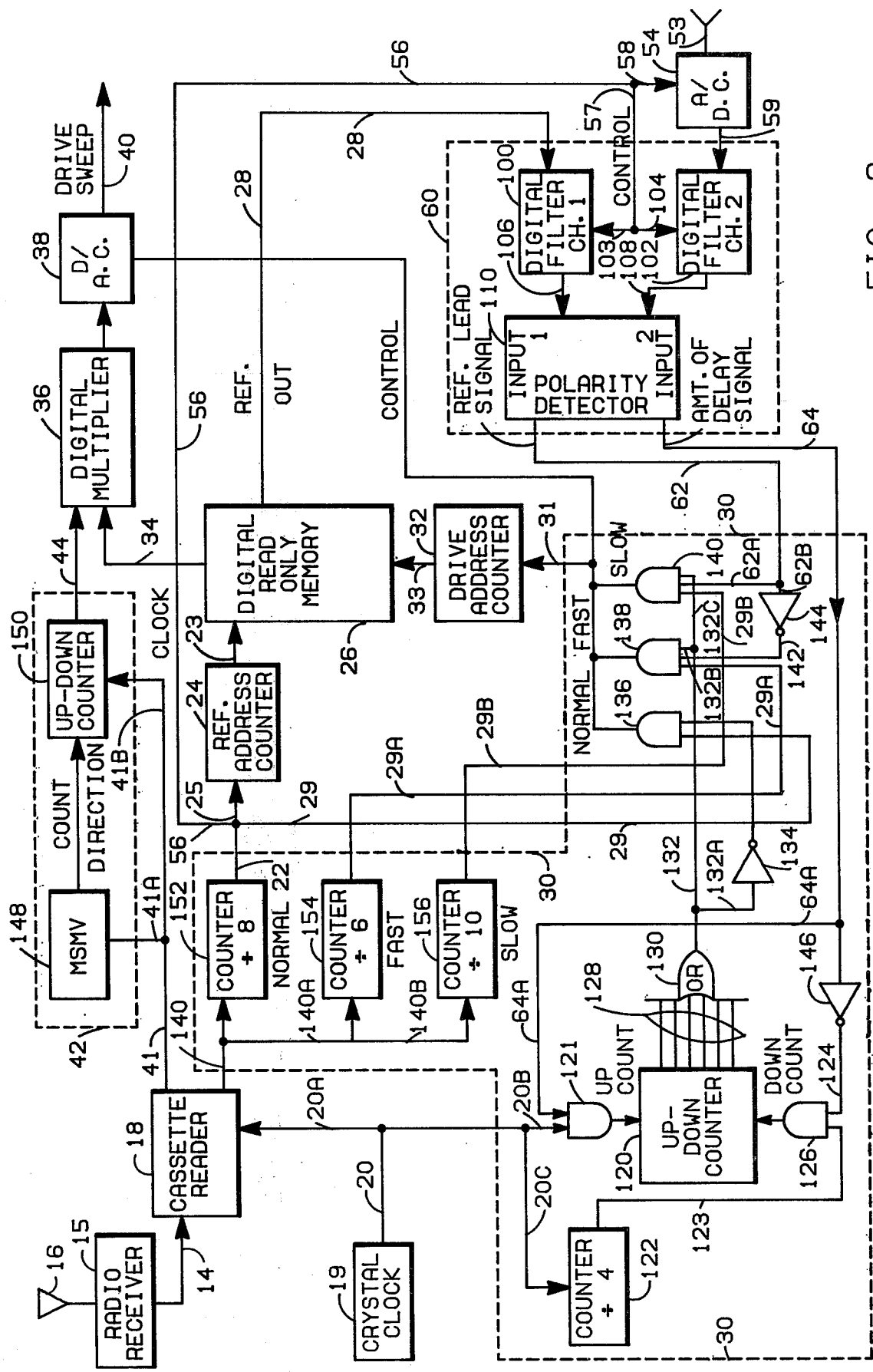
FIG. 3 illustrates in more detail the apparatus of FIG. 1.

Referring now to FIG. 3, there is shown in considerably greater detail certain parts of the apparatus of FIG. 1. The corresponding parts are indicated by the same numerals, such as, for example, the antenna 16, the radio receiver 15, the incoming signal line 14, the cassette reader 18, read-only memory 26, etc. The dashed-line box labeled 42 provides details for the box 42 of FIG. 1. Similarly, the dashed-line box 60 provides further details of the phase comparator 60 of FIG. 1, while box 30 shows details of the frequency ratio control 30.

Consider the box 60 in comparison with the corresponding box 60 of FIG. 1. As in FIG. 1, the signal from the integrator of the sensor output on line 53 goes to the analog-to-digital converter 54 which has an output on line 59 to the box 60. It goes inside the box to a digital filter 102. Correspondingly, the reference sweep signal on line 28 goes into the box 60 and to the digital filter 100. These two filters are identical in their operation and, to the extent that they eliminate harmonics, provide two signals outputting on lines 106 and 108 which carry the phase information of the reference sweep signal and the baseplate output signal. These two signals on leads 106 and 108 go to a polarity detector 110 where they are converted to square waves, and the times of zero crossing of the two signals are compared to determine what the relative phase of the signals is at the moment. One signal outputs on line 62, and by its polarity indicates, by a logical 1 or a logical 0, whether the reference signal leads the baseplate signal or vice versa. The other output of the polarity detector 110 on lead 64 provides a logical 1 during the time between the zero crossings, and is a measure of the lag of the baseplate signal behind the reference signal.

The pulses on line 22, of a frequency which corresponds to the digitizing interval of the digital signals on the output line 28 to the reference sweep are carried by line 56 to control the analog-to-digital converter 54 over lead 58, and over lead 57 and leads 103 and 104 to control the shifting of the digital values on the input of the filters 100 and 102, through the filters and into the polarity detector 110.

Referring to the frequency ratio control box 30, this is a complex circuit controlled by the polarity detector 110 to drive the second address counter 32 and cause a signal to be outputted on line 34 to provide the drive sweep signal 40. The pulses leaving the cassette reader 18 on line 140 go through a divide-by-8 counter 152 to line 22, line 25, and the reference address counter 24. There are two other counters connected to reader 18 by leads 140A and 140B, namely a divide-by-6 counter 154, and a divide-by-10 counter 156. The divide-by-8 counter goes by leads 22 and 25 to the reference address counter 24. It also goes by lead 29 to an AND gate 136, the output of which goes through lead 31 to the drive address counter 32. The divide-by-6 counter 154 goes by lead 29A to the AND gate 138, and counter 156 goes by lead 29B to AND gate 140. The outputs of all three gates to go the lead 31 and the drive address counter 32. There are other inputs to the three gates, but mainly the pulses which go to the drive counter 32 will be identical to those going to the reference address counter 24 if the gate 136 is enabled. The pulses to 32 will be faster if the gate 138 is enabled, and they will be slower if the gate 140 is enabled.

The control of which gate is enabled is responsive to the output of the polarity detector on the leads 62 and 64. Lead 62, which is labeled reference lead signal, puts out a logical 0 when the reference signal leads the sensor signal, and in that case, going by lead 62B and the inverter 144, there is a logical 1 signal on lead 142 which enables the gate 138 to put a more rapid pulse drive on the address counter 32, and therefore cause the drive sweep to advance in phase with respect to the reference sweep. On the other hand, if the reference sweep lags, the opposite is true and a logical 1 on leads 62 and 62A enables the gate 140 and causes the phase of the drive sweep to decrease.

A further control of the gates 136, 138, 140 comes from the up-down counter 120, the output of which on leads 128 goes to an OR gate 130 which connects through leads 132, 132B and 132C to the gates 138 and 140 respectively, and by lead 132A to an inverter 134 and to the gate 136. The control on lead 64 goes to enable one or the other of gates 126 or 121. Gate 121 carries a drive signal from the clock 19 to the up terminal of the up-down counter 120, while gate 126 carries the clock signal divided by 4 (in the counter 122, and lead 123) to the down terminal of the up-down counter. The signal on line 64 is in the form of a logical 1 that measures the amount of lag between the reference sweep and the sensor signal, and this then controls the up or the down count of the counter 120. The output of the counter is on a plurality of leads, some of which are logical 0 and some of which are logical 1 at any instant. If the counter is in the middle of its count, the center lead will be a logical 0 and, consequently, the output of the OR gate 130 on lead 132 will be a logical 0 and the signal out of the inverter 134 will be a logical 1 which will enable gate 136 and will cause the drive address counter to receive the same pulse rate that the reference address counter 24 receives, and so the two digital signals outputted on leads 28 and 34 will advance in phase at an equal rate. This is the condition that applies during most of the operation. On the other hand, if the counter is down or up from the nominal value, then a positive or logical 1 signal will be outputted on lead 132 and will enable both gates 138 and 140, and depending on whether the reference leads or lags the sensor signal, one or the other of gates 138 or 140 will be further enabled to apply a faster or a slower pulse rate to the address counter.

In this way, the phases of the reference signal on lead 28 and of the sensor signal on lead 59 are compared in phase and the drive address counter 32 is controlled in such a way that the drive sweep signal on 34 will be varied in phase to a greater or a lesser angle with respect to the phase of the reference signal on 28 to bring the comparison of the reference and sensor signals back to the selected phase angle of 0.

The box labeled 42 includes a monostable multivibrator 148 which controls the up-down counter 150 to read up, or to read down. The rate at which the counter operates depends on the signal to it on the lead 41B, which is derived from the signal on lead 41 from the cassette reader 18. In other words, at the start of the sweep the counter is set at its minimum value, or maximum down count, and at the time the cassette starts and pulses are applied to the counters, the multivibrator 148 is switched on. That starts the count up, and the pulses that follow increment the counter up. Its output in digital numbers goes continuously by lead 44 to the digital multiplier 36. These numbers which are fractional numbers, multiply the digital values which have been derived from the read-only memory. After the digital signals are converted to analog in the box 38, the drive sweep will be a sinusoidal signal of increasing amplitude at the beginning of the sweep, to a maximum value, at which time the counter 150 will be in its maximum point and thereafter the pulses in line 41 will stop. Near the end of the sweep, when it is desired to taper the amplitude downward, the monostable multivibrator 148 having been reset by itself, will now control the counter to count down. As the pulses start, the counter will count down from 1 to 0, and the corresponding amplitudes of the drive sweep will be reduced correspondingly to zero.

Figure 4:
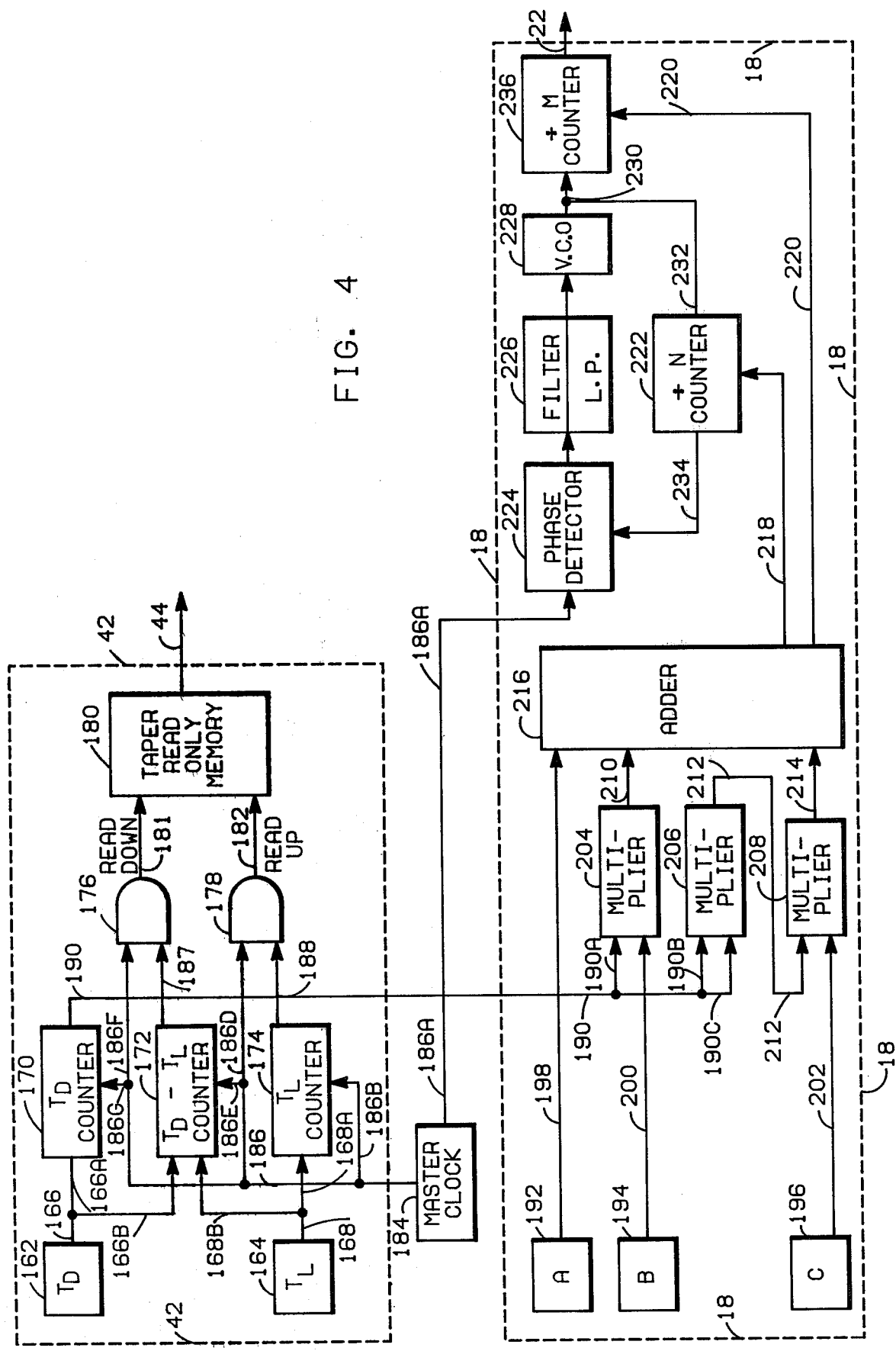
FIG. 4 illustrates a second embodiment comprising two electronic circuits, one for providing a taper multiplier number, and the other for generating the pulse train.

Referring now to FIG. 4, consider the dashed outline 42 which includes apparatus which in effect duplicates that of box 42 of FIG. 3 and provides an electronic means for generating the digital fractional numbers which are supplied to the digital multiplier 36 by the lead 44 in order to taper the amplitude of the drive sweep at the beginning and end of the sweep.

There are three counters 170, 172, 174. The first counter 170 is preset by a control 162 which is $T_D$ the time duration of the sweep. The third counter 174 is preset by a control 164 labeled $T_L$ which is the time duration of the length of the taper. These outputs on lead 166 to the counter 170 and on lead 168 to the counter 174, also go by leads 166B and 168B to the third counter 172 which is preset to a value of count or time equal to the total duration of the sweep minus the duration of the taper. The three counters have output leads. The outputs of counter 172 on lead 187 goes to AND gate 176 and the output of counter 174 goes by lead 188 to AND gate 178. The master clock 184 puts out a signal on lead 186 that goes to each of the three counters and to each of the two AND gates. The outputs of the AND gates go by lead 181 to read-down control on a read-only memory 180, and the gate 178 has an output on lead 182 that goes to the read-up control of read-only memory 180.

At the start, the clock pulses going by lead 186B to counter 174 go out on lead 188 to the gate 178. Also the clock output on 186D goes to the gate 178 so that each pulse of the clock then has an output on lead 182 to the read-up control. Thus the read-only memory 180 will read up from its minimum position to successively higher values. At each successive value a digital word is outputted on line 44 which represents a fraction between 0 and 1, which goes to the digital multiplier 36 which has been previously described. By this means, the counter 174 will continue the read-up operation until it reaches its maximum preset value and stops counting. Consequently, the gate 178 is disabled and thereafter there is no output on lead 182.

At the same time, the clock pulses go to the counter 170 which runs for the complete duration of the sweep, and that puts the clock pulses on an output line 190 which goes into box 18, which will be described presently. When the count reaches the total duration of the sweep minus the taper length, then the counter 172 begins to operate and puts out clock pulses on lead 187 while the clock itself puts out pulses on lead 186F to the gate 176, and the read-only memory then starts to read down, due to the pulses on lead 181. These corresponding digital words in storage are then carried by lead 44 to the digital multiplier as before. In this way the proper digital control of the taper of the sweep is effected.

Referring now to the FIG. 4 and the large box enclosed by the dashed line 18, this apparatus comprises a digital means for generating a series of pulses of a selected frequency, or period between each pulse, which is outputted on lead 22, which corresponds to that which is the output of the cassette reader 18 on lead 22.

Consider an adder 216 that has three inputs. One input on lead 198 comes from an input control 192 which represents a certain constant digital number, A. The control 194 represents a second constant number, B, and the control 196 represents a third constant number, C. There are multipliers 204, 206 and 208, and the manner of connection which will be described is set to mechanize an equation of the form: Frequency=$A+Bt+Ct^2$. In this way, a frequency will be generated which can vary in a preselected manner as a function of time.

The clock signal on lead 190 goes to a multiplier 204 on lead 190A, the other input of which is a digital word outputted from the control 194 by lead 200. The output of the multiplier 204 on lead 210 then provides a continually changing digital word which is equal to the product Bt.

The clock output on leads 190B and 190C go as two inputs to a multiplier 206, the output of which on lead 212 is proportional to $t^2$, and this goes as one input to multiplier 208, the other input of which is the digital word from control 196 over line 202 representing the constant C. The output on lead 214 then is a digital word equal to $Ct^2$. The total count of adder 216 is then proportional to the frequency, as given by the previous equation.

The master clock 184 puts out its signal also on lead 186A, which goes to a phase detector 224. The output of the phase detector is filtered in the low-pass filter 226 and a dc voltage output of the filter controls the voltage-controlled oscillator (VCO) 228 to put out a frequency on lead 230 which is proportional to the voltage input. There is feedback from line 230, by means of line 232, to a ÷N counter 222 which has an output lead 234 which goes to the phase detector. Consequently, the phase detector creates a voltage output which is a function of the phase difference between its two input signals on 186A from the clock, and 234 from the counter 222. In other words, when the frequency on line 230 reaches a value of N times the frequency of the clock on lead 186A, there will be phase lock in that loop and the frequency output on line 230 will be constant, and N times the input frequency from the clock. By changing the value of N, it is possible to vary the frequency at the line 230 in proportion to N.

Beyond the line 230 there is a second counter 236 which is arranged to divide by a factor M, to output a frequency on line 22 which is a function of N divided by M, times the clock frequency. By choosing selected values of N and M, it is possible to provide any desired frequency at lead 22 in terms of the constant clock frequency on line 186A.

The values of N and M are derived from the adder 216, and these values change proportional to the total count in the adder, so that as a function of time the frequency of the signal on line 22 will be proportional to the total output of the adder at any time which is proportional to the frequency in accordance with the equation previously stated.

In review, a frequency function is decided on and is mechanized by means of three constants A, B and C and a continuously increasing pulse count, representing time. All of these are added in an adder, the total count of which is proportional to the desired frequency. There is a phase locked loop comprising the phase detector 224, the voltage controlled oscillator 228, and the counter 222 in feedback, and a further countdown by counter 236, to provide a frequency signal on the line 22 which is a function of the clock frequency times N/M. The numbers N and M are derived as a function of the total count of the adder 216 and therefore control the output of the phase-locked loop on lead 22 as a function of the defined frequency.

What has been shown is a novel system for digitally creating two sweep signals which are sinusoidal signals of varying frequency. The phase of the drive sweep is modified in terms of the phase of the reference sweep by choosing the particular rates of frequency signals applied to two counters, one of which is a constant frequency and the other is a variable frequency, the value of which is obtained from the constant frequency by ratio modification, controlled by a phase comparator, the output of which is a function of the phase angle between a reference sweep and the phase of the displacement of the baseplate motion.

The computation of the sinusoidal signals is by digital read-only memory, and the frequency of the output is responsive to the frequency at which impulses are provided to counters which control the readout from the memory.

In one embodiment, the pulses which control the read-only memory are derived from a prerecorded magnetic tape. In another embodiment, they are obtained from a logic circuit that calculates frequency in response to an equation $A + Bt + Ct^2$. The total count of the adder then is proportional to the frequency selected. The counter then provides signals to a $\div N$ counter and a $\div M$ counter, which control a phaselocked loop to provide an output frequency which is a function of the equation. This frequency then can be substituted for the recorded pulse train in the cassette, and can go to operate the first and second counters which control the readout from the read-only memory.

Also, means are provided for tapering the beginning and terminal ends of the drive sweep, and this is done by means of a digital multiplier and a series of digital words provided by a counter which is constantly incremented or by a read-only memory which is read out progressively as a function of time.

While this invention has been described in terms of a specific driven system, namely an electrohydraulic vibrator such as is used in seismic exploration, this is done simply for convenience and provides no limitation as to the application of the apparatus described. This is solely for convenience and provides an ideal application for the apparatus.

This apparatus is novel in a number of respects, particularly in the use of a read-only memory which, by addressing from two separate counters, provides simultaneously two digital sweep signals. It also is novel in the manner of generating the digital sweep signal by the use of a pulse train of varying frequency, the pulse train being derived either from a prerecorded tape or by a digital logic circuit as described. It is novel also in the use of digital filters in each of the two lines, namely, the lines carrying the reference sweep signal and the sensor signal, to insure that the two signals are free of extraneous harmonics which might affect the phase comparison. It is novel also in the manner in which the phase comparison controls the rate of the second counter which produces the drive sweep, by the use of a circuit which in effect provides a variable frequency ratio control.

While there have been a number of elements in the circuits which have been described in terms of their character, such as a read-only memory, adders, multipliers, clocks, preset counters, voltage-controlled oscillator, phase detector, dividing counters, etc., all of these are commercial devices which are available on the market and are fully described in catalogs and in textbooks, and therefore require no further detailed explanations.

While the invention has been described with a certain degree of particularity, it is manifest that many changes may be made in the details of construction and the arrangement of components. It is understood that the invention is not to be limited to the specific language used or the specific embodiment set forth herein by way of exemplifying the invention, but the invention is to be limited only by the scope of the attached claim or claims, including the full range of equivalency to which each element or step thereof is entitled.

I claim:

1. A phase control system for controlling a seismic electrohydraulic vibrator to operate in synchronism with a reference sweep signal comprising a sinusoidal signal of varying frequency, of selected frequency bandwidth and selected time duration, comprising:
   (a) a source of a train of pulses, the time interval between the pulses varying the time in a selected manner;
   (b) memory means for storing a plurality of digital words, each in known serial address location, said words representative of the digitized values of one cycle of a sine wave;
   (c) first counter means responsive to the pulse train of said source for successively addressing said memory locations; whereby a first output of said memory means comprises a digital sinusoidal reference sweep signal of varying frequency;
   (d) second counter means responsive to the pulse train of said source modified by a frequency ratio control means, the output of said second counter means addressing said memory locations; whereby a second output of said memory comprises a digitized sinusoidal drive sweep signal of varying frequency and of different phase with respect to said reference sweep signal;
   (e) digital-to-analog converter means receiving said drive sweep signal, the output of said converter means connected to said vibrator;
   (f) sensor means responsive to the vibration of the baseplate of said vibrator, the output of said sensor means connected to an analog-to-digital converter means to provide a digital sensor signal; and
   (g) means to compare the phase of said digital sensor signal and said reference sweep signal, and means responsive to said phase comparison to alter the ratio of said frequency ratio control means.

2. The system as in claim 1 including means to taper the amplitude of said drive sweep signal at its ends.

3. The system as in claim 2 in which said means to taper said drive sweep signal includes counter means, and means to multiply the reading of said counter means times the digital values of said drive sweep signal.

4. The system as in claim 1 in which said source of a train of pulses comprises magnetic recording means.

5. The system as in claim 1 in which said sensor means is an accelerometer and including means to doubly integrate the output of said sensor means.

6. The system in claim 1 including in said means to compare, means to digitally filter, with identical filters, said reference sweep signal and said digital sensor signal.

7. The system as in claim 1 including in said means to compare, means to determine when the phase of said reference signal leads the sensor signal, and means to determine the amount of phase lead or lag of said reference sweep signal.

8. The system as in claim 2 in which said means to taper comprises read-only memory means; read-up counter means, and read-down counter means for addressing the memory locations in said read-only memory, the words stored in said memory locations representing fractions less than unity, and means to multiply the output of said read-only memory times the digital values of said drive sweep signal.

9. The system as in claim 1 in which said frequency ratio control means includes first means to divide the pulse rate of said source by a factor D, second means to divide by E and third means to divide by F; means to drive said first counter means by the pulse rate of said first means; and means to drive said second counter means, responsive to the output of said phase comparison means, by a combination of said first and second means, or said first and third means, where E is less than D and F is greater than D, dependent on whether said reference sweep signal leads or lags said baseplate sensor signal, respectively.

10. The system as in claim 1 in which said source of said train of pulses comprises:
(a) clock means providing a constant frequency signal f;
(b) Phaselocked loop means including 1. phase detector means, said clock means connected to said phase detector means;
2. voltage controlled oscillator means responsive to said phase detector means;
3. the output of said VCO connected to the input of said phase detector means through a $\div N$ counter means; and
4. means to divide the output frequency of said VCO by a factor M, where N and M have selected values.

11. The system as in claim 10 including
(a) adder means;
(b) means to supply to said adder means a digital number A, where A is a selected constant;
(c) means to supply to said adder means a digital number proportional to Bt, where B is a selected constant and t is a digital number proportional to the output rate of said clock means;
(d) means to supply to said adder means a digital number proportional to $Ct^2$, where C is a selected constant, and t is a digital number proportional to the output rate of said clock means; and
(e) means responsive to the digital content of said adder means to determine the values of N and M.

* * * * *